US012606261B2

(12) United States Patent
Broadbent et al.

(10) Patent No.: US 12,606,261 B2
(45) Date of Patent: Apr. 21, 2026

(54) CARGO PACK, FOR EXAMPLE FOR MOUNTING ON A BICYCLE

(71) Applicant: TAILFIN LIMITED, Bristol (GB)

(72) Inventors: Nicholas Broadbent, Long Ashton North Somerset (GB); Robert Phillips, Bristol (GB); Jack Bracken-Lobb, Bristol (GB)

(73) Assignee: TAILFIN LIMITED, Bristol (GB)

( * ) Notice: Subject to any disclaimer, the term of this patent is extended or adjusted under 35 U.S.C. 154(b) by 320 days.

(21) Appl. No.: 18/448,206

(22) Filed: Aug. 11, 2023

(65) Prior Publication Data

US 2024/0051633 A1 Feb. 15, 2024

(30) Foreign Application Priority Data

Aug. 12, 2022 (GB) ...................................... 2211838
Aug. 7, 2023 (GB) ...................................... 2312085

(51) Int. Cl.
 *B62J 9/27* (2020.01)
 *B62J 9/21* (2020.01)
(52) U.S. Cl.
 CPC .. *B62J 9/27* (2020.02); *B62J 9/21* (2020.02)
(58) Field of Classification Search
 CPC ....... B62J 11/00; B62J 7/00; B62J 7/02; B62J 7/04; B62J 7/06; B62J 7/08; B62J 9/00; B62J 9/20; B62J 9/21; B62J 9/23; B62J 9/24; B62J 9/26; B62J 9/27; B62J 9/30
 USPC ...................................................... 224/420
 See application file for complete search history.

(56) References Cited

U.S. PATENT DOCUMENTS 7,922,136 B2 * 4/2011 Lien ........................... B62J 9/21
224/431

FOREIGN PATENT DOCUMENTS

| | | | |
|---|---|---|---|
| DE | 20319542 U | 5/2004 | |
| DE | 10327652 B3 * | 9/2004 | ............... B62J 9/21 |
| EP | 0854819 A1 | 7/1998 | |
| TW | 100204720 U | 3/2011 | |
| TW | 201233579 A | 8/2012 | |

OTHER PUBLICATIONS

DE-10327652-B3 Translation, Loehr Hans-Gerhard, Sep. 9, 2004 (Year: 2004).*
Search Report dated Jan. 23, 2024 in co-pending UK Patent Application No. GB2312085.0.

* cited by examiner

*Primary Examiner* — Nathan J Newhouse
*Assistant Examiner* — Matthew T Theis
(74) *Attorney, Agent, or Firm* — Perilla Knox Hildebrandt Staley & Amy LLP

(57) ABSTRACT

A cargo pack carrier comprises an arm 18 for attachment at one end to a handlebar 12 of a bicycle, a mounting structure 20 which is adjustably fitted to the other end of the arm, and a carrier structure 22 for attachment to the cargo pack 14. The mounting structure comprises a mounting member 30 for receiving an attachment element 44 of the carrier structure 22, and an anti-rotation element 40 which is spaced from the mounting member 30 and is engageable with an anti-rotation abutment 60 of the carrier structure 22 to prevent rotation of the carrier structure 22 about the mounting member 30.

22 Claims, 7 Drawing Sheets

CARGO PACK, FOR EXAMPLE FOR MOUNTING ON A BICYCLE

This invention relates to a cargo pack, and is particularly, although not exclusively, concerned with a cargo pack to be mounted on a bicycle, for example on the bicycle handlebars.

Bikepacking is a popular leisure pursuit which often involves multi-day touring on a bicycle, often an off-road bicycle such as a mountain bike. Everything needed for touring is carried on the bicycle or by the rider. There is therefore a need for luggage containers, often referred to as cargo packs, which can be attached to the bicycle and can be loaded with equipment such as clothing, sleeping bags and food.

"Soft" packs, such as collapsible bags, are known for this purpose, but pose particular problems. When such packs are mounted on the bicycle handlebars, it is important for them to be kept away from the front wheel to avoid abrasion and the accompanying buzzing noise. The packs must also be kept away from control elements such as brake levers, gear change controls, trip computers, etc. Also, it is desirable for the packs to be centralised on the handlebars to avoid imbalance. These requirements can be difficult to achieve if the contents of the pack may vary in volume, for example if an item of clothing is taken out of, or placed in, the pack.

According to the present invention there is provided cargo pack carrier comprising an arm for attachment at one end to a component of a bicycle, a mounting structure which is adjustably fitted to the other end of the arm, and a carrier structure for attachment to the cargo pack, the mounting structure comprising a mounting member for receiving an attachment element of the carrier structure, and an anti-rotation element which is spaced from the mounting member and is engageable with an anti-rotation abutment of the carrier structure to prevent rotation of the carrier structure about the mounting member.

The mounting member may comprise a cylindrical journal and the attachment element may comprise a part-cylindrical recess in which the journal is accommodated. The attachment element may be provided with a latch for retaining the mounting member within the recess. The latch may be actuated manually for displacement between a release position in which the mounting member is movable into and out of the recess, and a latched position in which the latch prevents removal of the mounting member.

The mounting member may comprise a pair of cylindrical journals, and the attachment element may be one of two attachment elements with respective part-cylindrical recesses and latches. The latches may be actuated by a common control element, such as a handle, and the handle may be operatively connected to the latches through a cam mechanism which enables both latches to be actuated simultaneously in a single operation.

The anti-rotation element on the mounting structure may comprise a lever which is fixed with respect to the mounting member and projects outwardly of the axis of the or each journal. The anti-rotation abutment on the carrier structure may comprise a bar secured to the carrier structure for engagement with the anti-rotation element. The anti-rotation element may be provided with a recess for receiving the bar.

Where the attachment element or elements are provided with respective latches, they may operate to displace the bar into the recess of the anti-rotation element of the mounting structure.

The anti-rotation element may project from the mounting structure in a direction generally away from the said one end of the arm. Alternatively, the anti-rotation element may project from the mounting structure in a direction obliquely towards the said one end of the arm.

The carrier structure may comprise a stiffening component to which the attachment element and the anti-rotation abutment are secured. The anti-rotation abutment may be carried by the attachment element. Alternatively the anti-rotation abutment and the attachment element may be separately secured to the stiffening component.

Another aspect of the present invention provides a cargo pack assembly comprising a cargo pack and a cargo pack carrier as defined above.

Where the carrier structure comprises a stiffening component, the stiffening component may be situated within the cargo pack and the carrier structure may be situated on the exterior of the cargo pack.

A further aspect of the present invention provides a bicycle provided with a cargo pack carrier or a cargo pack assembly as defined above, in which case the arm may be connected to a handlebar of the bicycle.

For a better understanding of the present invention, and to show more clearly how it may be carried into effect, reference will now be made, by way of example, to the accompanying drawings, in which.

Figures 1, 2:
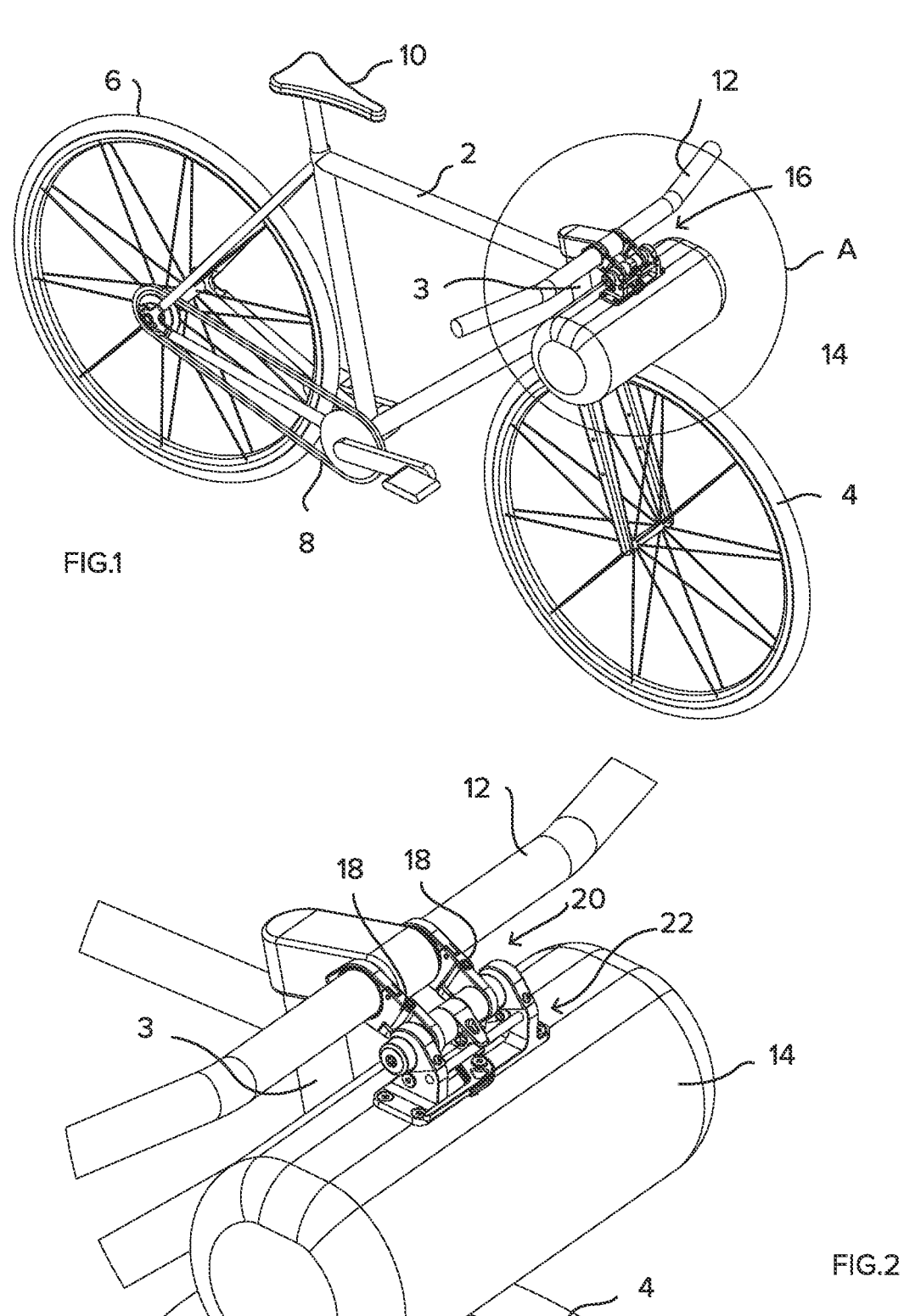
FIG. 1 shows a bicycle with a cargo pack attached to the handlebars by an attachment mechanism.
FIG. 2 is an enlarged view of the region A in FIG. 1.
Figures 3, 4:
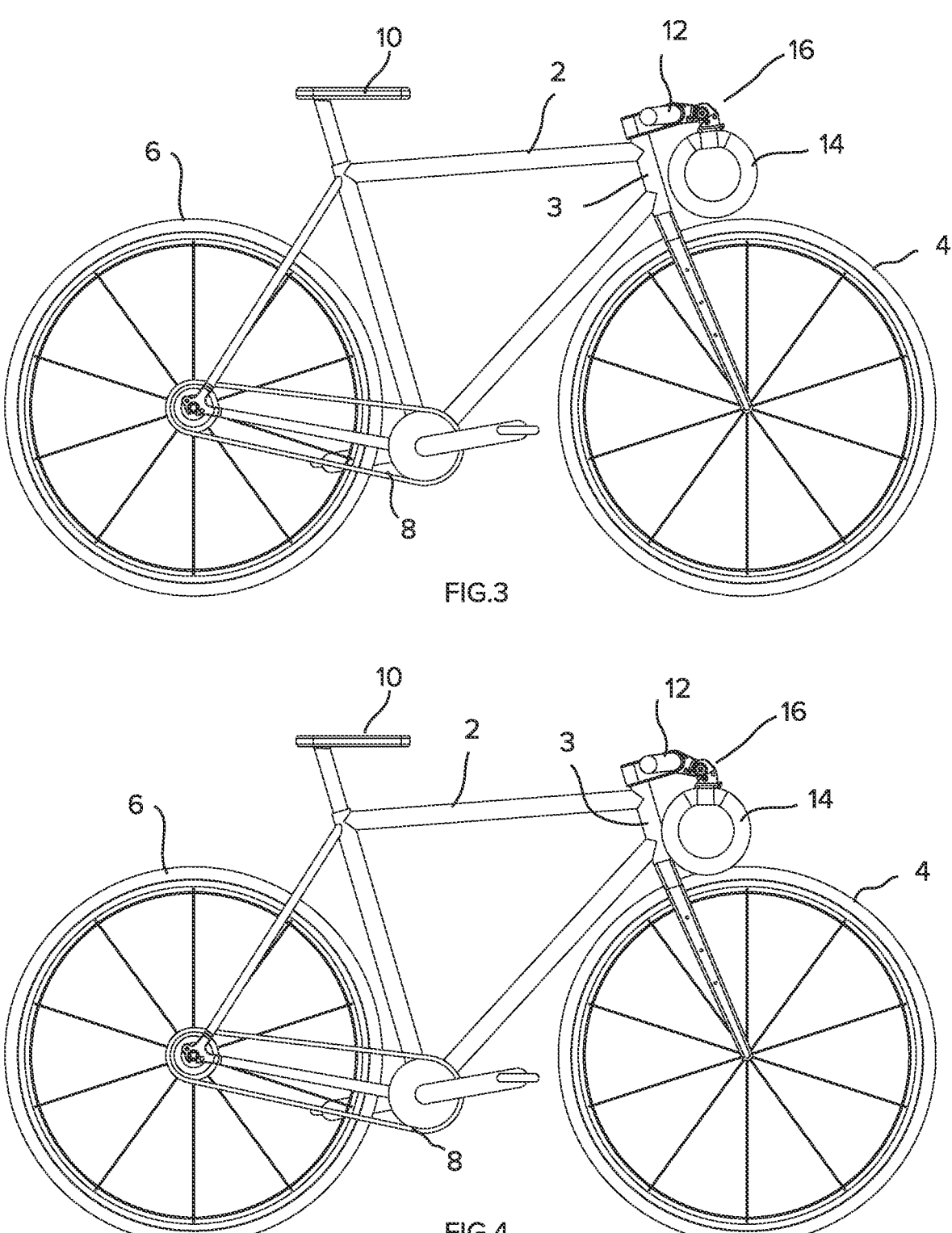
FIG. 3 is a side view of the bicycle with the cargo pack in a desired position.
Figures 5, 6:
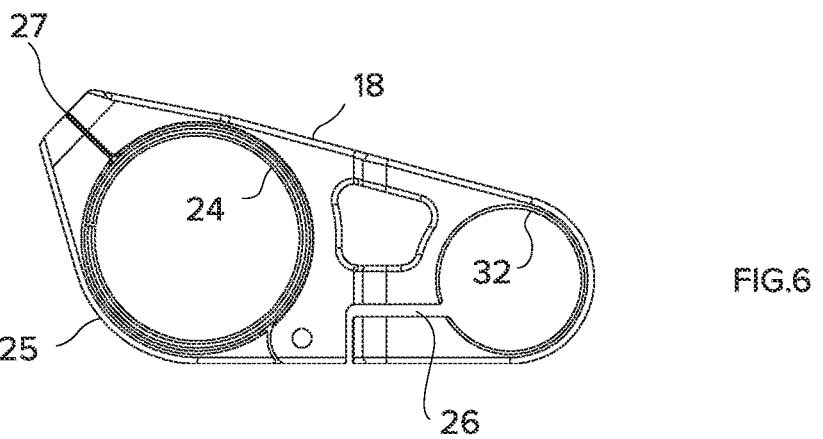
Figure 7:
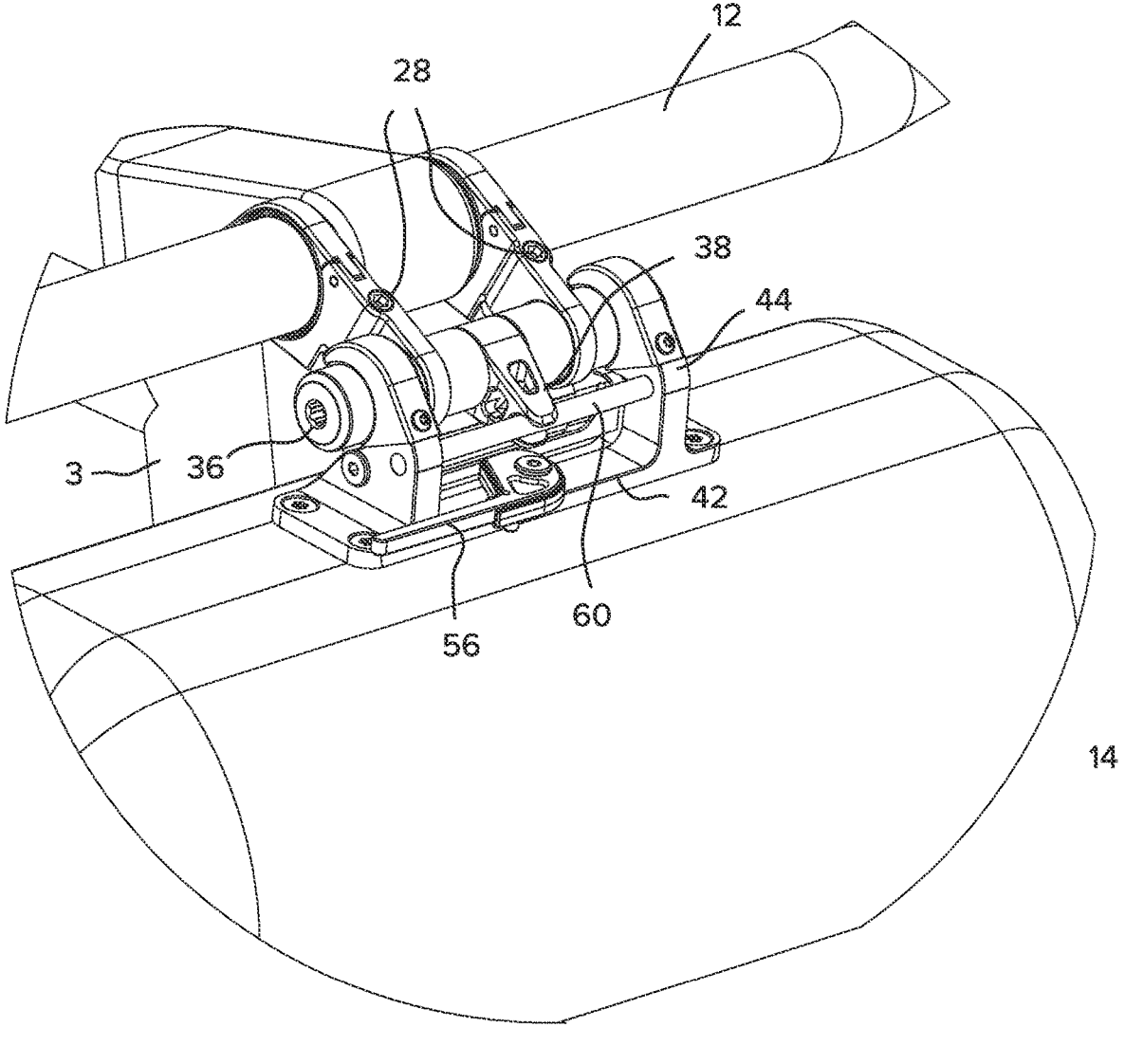
Figure 8:
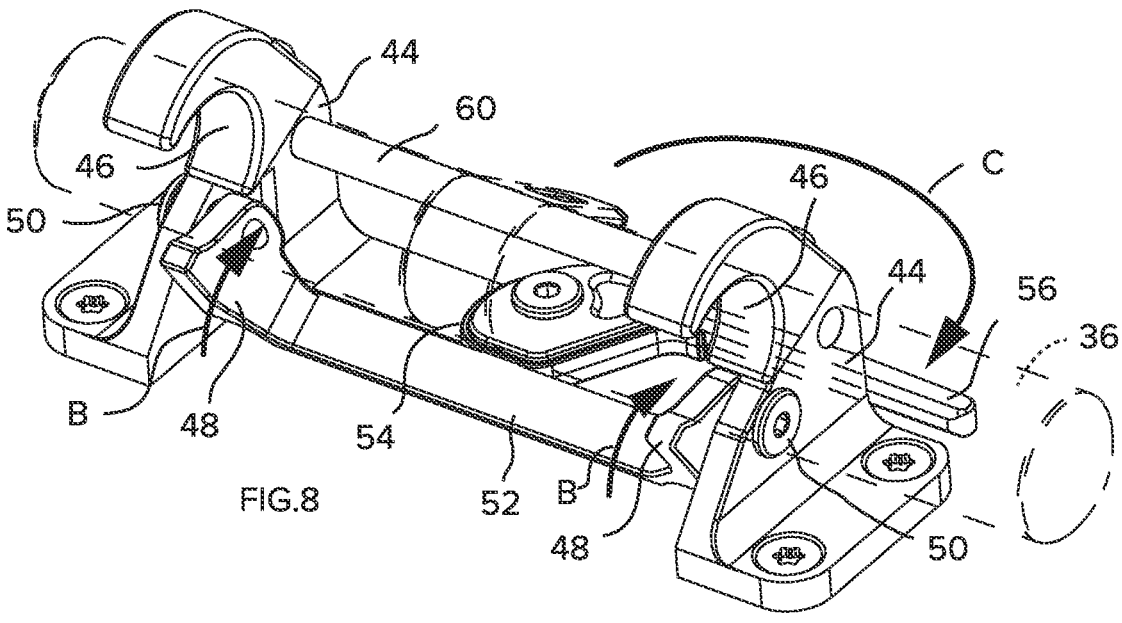
Figure 9:
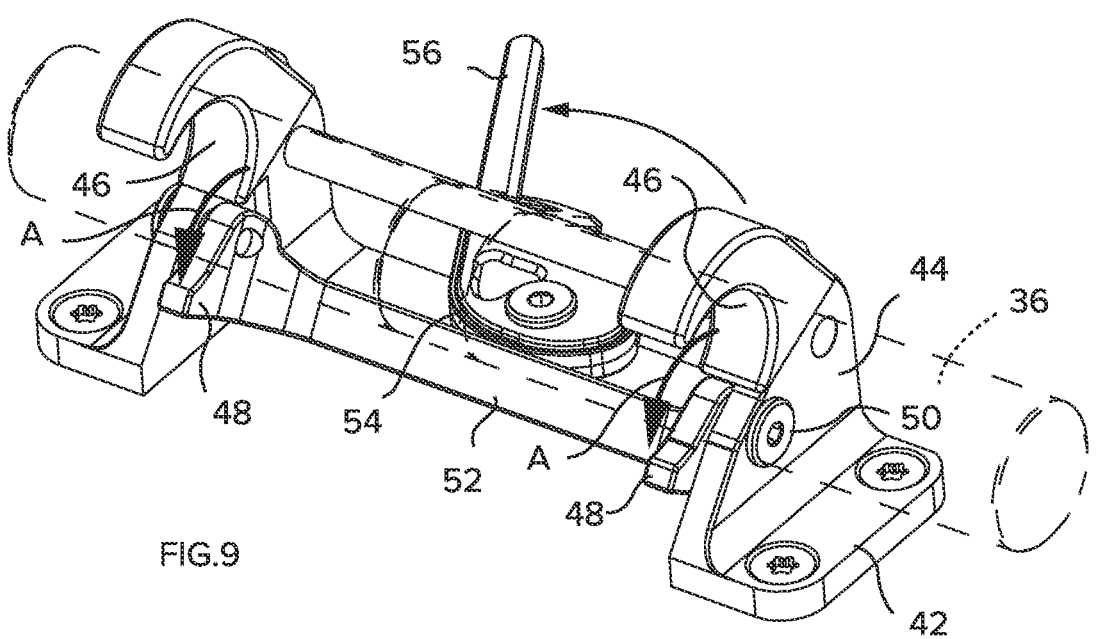
Figure 10:
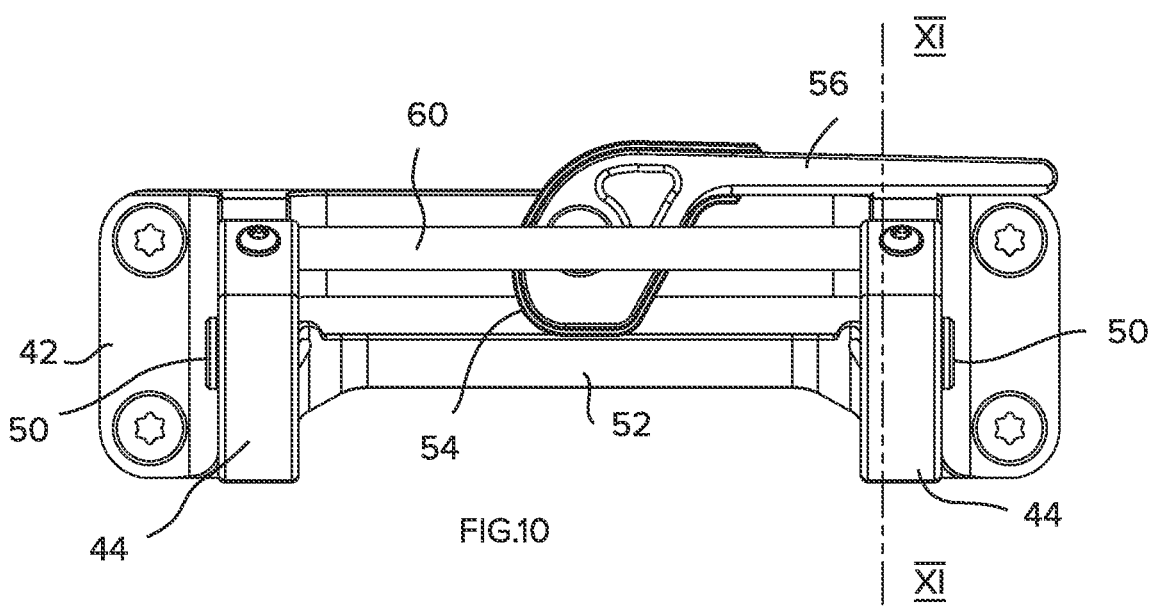
Figure 11:
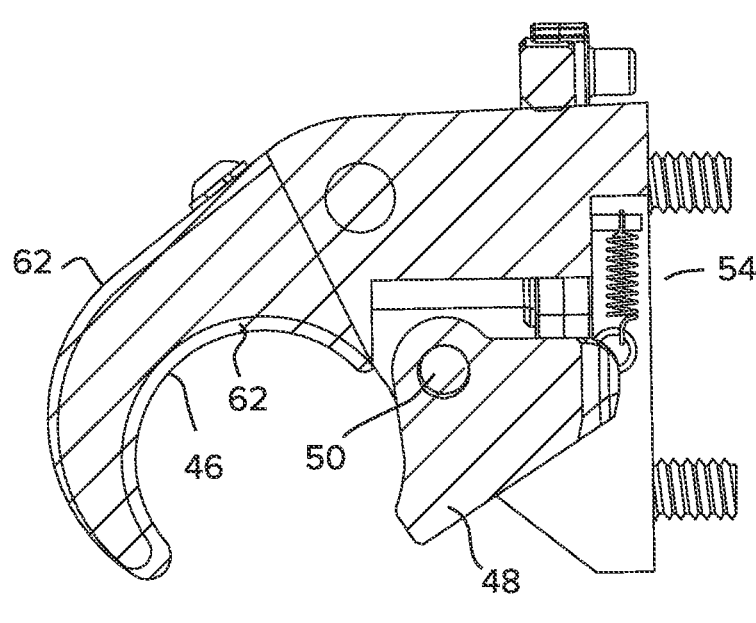
Figure 12:
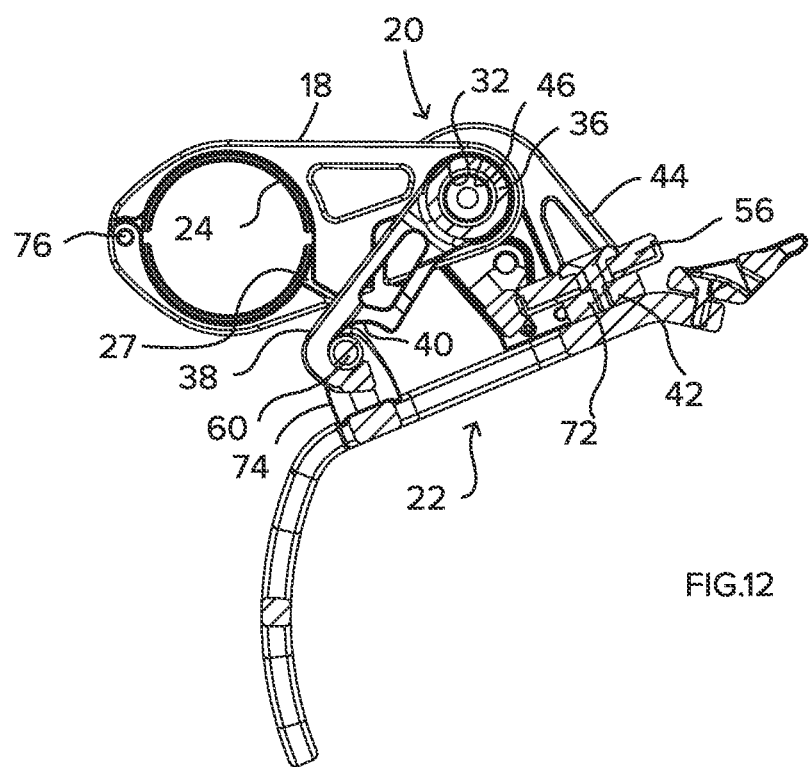

FIG. 4 corresponds to FIG. 3 but shows the cargo pack in a different position;

FIG. 5 shows the connection between the cargo pack and the bicycle with the cargo pack detached from the bicycle;

FIG. 6 shows an arm of the attachment mechanism;

FIG. 7 corresponds to FIG. 6 with the cargo pack attached;

FIG. 8 shows the cargo pack attached to the bicycle and locked;

FIG. 9 corresponds to FIG. 8 but shows the cargo pack unlocked;

FIG. 10 is a top view of the structure shown in FIG. 8;

FIG. 11 is a sectional view taken on the line XI-XI in FIG. 10;

FIG. 12 is a sectional view of an alternative embodiment;

and

Figure 13:
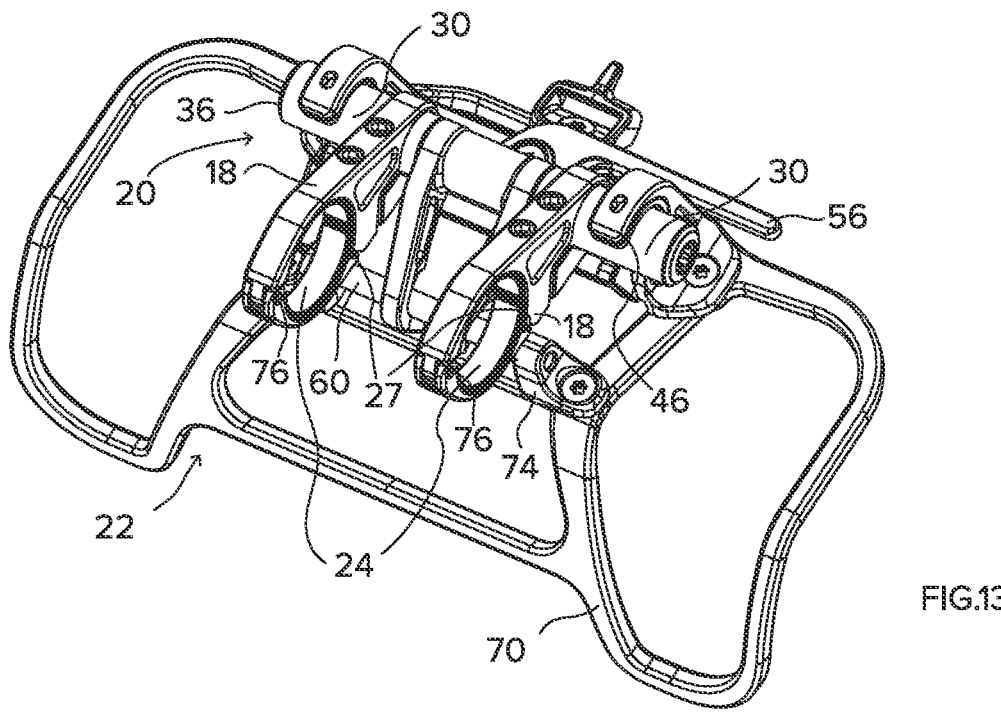

FIG. 13 is a perspective view of the embodiment shown in FIG. 12.

The bicycle shown in diagrammatic form in FIGS. 1 to 4 comprises a frame 2, front and rear wheels 4 and 6, a chain drive 8, a saddle 10 and handlebars 12 controlling the front wheel 4. The frame 2 includes a head tube 3 which supports the front wheel 4.

The handlebars 12 comprise a tubular member having a circular cylindrical profile, although it will be appreciated that other forms of member, and other profiles, could be used.

A cargo pack in the form of a bag 14 is supported by the handlebars 12 by an attachment mechanism 16 comprising a pair of arms 18, a mounting structure 20 and a carrier structure 22. The attachment mechanism 16 is shown in greater detail in FIGS. 5 to 10. Referring first to FIGS. 5 and 6, the arms 18 have cylindrical openings 24 through which the handlebars extend. The material surrounding the openings 24 is relatively thin and is split at 27. A bolt (not shown) extends across the split 27 and can be tightened to reduce the diameter of the opening 24 to ensure a firm grip of the arm 18 on the handlebars 12. For this purpose, a section 25 of the thin-walled section of the arm 18 surrounding the handlebars 12 may be made of a relatively flexible material, such as rubber or another elastomer, while the main body of each arm 18 is made from a rigid, possibly metallic, material such as aluminium or an aluminium alloy.

The mounting structure 20 comprises a cylindrical mounting member 36, the opposite ends of which serve as journals having cylindrical bearing surfaces 30. At positions spaced inwardly from its ends, the mounting member 36 is received in further openings 32 at the ends of the arms 18 away from the handlebars 12. As with the openings 24, the openings 32 are split at 26, as shown in FIG. 6, and can be reduced in diameter by means of respective bolts 28 to ensure a firm grip on the bearing surfaces 30 of the mounting structure 20. Consequently, the mounting structure 20 can be supported on the handlebars 12 in a manner that prevents rotation of the arms 18 about the handlebars 12 and of the mounting structure 20 about the arms 18.

Centrally on the mounting structure 20 there is a lever 38 which projects away from the bearing surface 30 and in a direction away from the ends of the arms 18 provided with the openings 24. At its end away from the mounting member 36, the lever 38 has a part-cylindrical notch or recess 40 serving as an anti-rotation element.

The carrier structure 22 comprises a base plate 42 which is secured to the bag 14. The base plate 42 has a pair of attachment elements in the form of upstands 44 which each have a part-cylindrical recess 46. The recesses 46 extend over less than 180° and have a radius of curvature complementary to that of the bearing surfaces 30. The carrier structure 22 can thus be placed in engagement with the mounting structure 20, with the mounting member 36 received in the recesses 46. Each upstand 44 is provided with a latch 48, and the latches 48 are interconnected by a beam 52 (see FIGS. 8 and 9). The latches 48 and the beam 52 form an integral unit which can pivot about an axis defined by bolts 50. As indicated in FIGS. 8 and 9, when the mounting member 36 is received in the recesses 46 of the upstands 44, the latches 48 can pivot between an open condition (FIG. 9) in which the mounting member 36 is free to move into and out of the recesses 46 and a closed condition (FIG. 8) in which the mounting member 36 is trapped by the latches 48 in the recesses 46.

The actuating beam 52 is biased by springs 54 (FIG. 11) in the direction indicated by arrows A in FIG. 9. The beam 52 is acted on by a cam surface 54 of a manual lever 56. Operation of the lever in the direction of the arrow C in FIG. 8 moves it from the unlocked position shown in FIG. 9 to the locked position shown in FIG. 8, and this causes the beam 52 to be pivoted about the bolts 50 to move the latches 48 in the direction of the arrows B from the unlocked condition shown in FIG. 9 to the locked condition shown in FIG. 8.

An anti-rotation abutment 60 in the form of a bar extends between the upstands 44. It will be appreciated that, when the carrier structure 22 is engaged with the mounting structure 20 (see FIG. 7), the bar 60 is situated within the notch 40 of the anti-rotation element 38, thus preventing rotation of the carrier structure 22 about the mounting member 36.

At least some of the components of the mounting structure 20 and the carrier structure 22 may have liners of resilient material. For example, the inner surfaces of the recesses 46, and part of the outer surfaces of the upstands 44 may have such liners, as indicated at 62, in order to provide some cushioning, or resilience, at the interface between contacting components. This serves to take up play between the components, so ensuring a rattle-free connection. Also, many of the components of the structure may be made from anodised aluminium which is easily damaged. The provision of such liners 62 can thus serve to protect the surfaces of those components. The notch 40 and/or the bar 60 may also be provided with liners. The liners may, for example, be made from Nylon or Acetal or some other suitable polymer.

For use, the arms 18, with the mounting structure 20, are fitted to the handlebars 12. The carrier structure 22 is secured to the pack 14, for example by attachment to a stiffener or reinforcing structure situated within the pack 14. The pack 14 can then be fitted to the mounting structure 20 by hooking the upstands 44 over the mounting member 36, so that the bearing surfaces 30 seat fully within the recesses 46. At the same time, the pack 14 is manipulated to bring the anti-rotation bar 60 into the notch 40 on the lever 38. When proper engagement is achieved, the lever 56 is moved by hand in the direction of the arrow C to the locked condition which forces the latches 48 into firm contact with the bearing surfaces 30. It will be appreciated from FIGS. 8 and 9 that the force exerted by the latches 48 on the mounting member 36 tends to urge the upstands 44 to the left as shown in FIGS. 8 and 9, so pressing the bar 60 firmly into the notch 40. The pack is thus secured to the mounting structure 20 so that it is not only locked in place but is also prevented from rotating about the journals 30.

The angular position of the arms 18 about the handlebar 12 can be adjusted by loosening and subsequently re-tightening the bolts controlling the diameter of the openings 24. Similarly, the angular position of the mounting structure 20 about the arms 18 can also be adjusted by loosening and re-tightening the bolts 28. In this way, the pack 14 can be positioned so that it is clear of the wheel 4 and the head tube 3, as shown in FIG. 3, and out of the way of any other controls or appliances fitted to, or in the vicinity of, the handlebars 12. Thus, contact between the pack 14 and, for example, the front wheel 4 and head tube 3 as shown in FIG. 4 can be avoided.

FIGS. 12 and 13 show an alternative embodiment of the attachment mechanism. Where appropriate, the same reference numbers have been used to designate the components of the mechanism of FIGS. 12 and 13 as in FIGS. 1 to 11.

As with the embodiment of FIGS. 1 to 11, the mechanism of FIG. 12 comprises a pair of arms 18 having cylindrical openings 24 for receiving and gripping the handlebars 12. The arms 18 support a mounting structure 20 in the form of a mounting member 36 having at each end a journal provided with a cylindrical bearing surface 30. Thus, when assembled, the mounting member 36 is fixed rigidly with respect to the handlebars received in the openings 24.

A lever 38 is rotationally fixed to the mounting member 36 and, in the embodiment of FIGS. 12 and 13, extends obliquely downwardly and towards the handlebars 12 i.e. towards the end of the arm 18 provided with the opening 24. The lever 38 has a notch or recess 40 towards its end, which may be provided with a resilient liner (not shown). As will be clarified below, the notch or recess 40 on the lever 38 constitutes an anti-rotation element.

The mechanism of FIGS. 12 and 13 also comprises a carrier structure 22 which comprises a stiffening component 70 which, in use, is situated within the bag 14. The carrier structure further comprises a base plate 42 which is situated on the exterior of the bag 14 and is secured to the stiffening component 70 by screws 72 which pass through the material of the bank 14. The carrier structure 22 also comprises an anti-rotation abutment 60 in the form of a bar which, in the embodiment of FIGS. 12 and 13, is supported between brackets 74 which are secured to the stiffening component 70 separately from the base plate 42.

The base plate 42 has a pair of upstands 44 of similar configuration to those of the embodiment of FIGS. 1 to 11. Thus, the upstands 44 have with recesses 46 so that the ends of the upstands 44 away from the stiffening component 70 have the form of hooks. The mechanism of FIGS. 12 and 13 is provided with a latch arrangement operated by a lever 56, this latch arrangement being generally similar to that described with reference to FIGS. 1 to 11.

For use, the carrier structure 22 of FIGS. 12 and 13 is assembled with the bag 14, with the stiffening component 70 situated within the bag 14 to give it a degree of structure, and the upstands 44 and the abutment 60 secured to the exterior of the bag by fastening to the stiffening component 70. It will be noted that a buckle component 76 is also secured in the same manner to the stiffening component 70 for use with a strap (not shown) for closing and compressing the bag 14.

In order to fit the bag 14 to the mounting member 36, the bag 14, including the carrier structure 22, is presented to the mounting structure 20 so that the hook regions of the upstands 44 are fitted over the journals 30 and, at the same time, the bar 60 enters the notch 40 in the lever 38. Subsequently, the lever 56 is moved towards the locked position, which both draws the journals 30 into the recesses 46 in the upstands 44 and draws the notch 40 into full engagement with the bar 60. This action compresses any liners present in the recesses 46, and/or on the bar 60 or the notch 40 resulting in a firm, Rattle-free, attachment of the bag 14 to the handlebars 12. The engagement of the bar 60 with the notch in the lever 38 prevents any rotation of the bag 14 about the axis of the mounting member 36.

It will be appreciated that, by means of the attachment mechanism 16 described above and shown in the drawings, the mounting of the pack 14 on the handlebars 12 can be achieved in a simple manner, using only the single lever 56, while establishing a rigid connection.

It will be appreciated that, although the attachment mechanism 16 has been described with reference to the mounting of a cargo pack 14 on the handlebars of a bicycle, it could also be employed mounting packs and other containers or implements different parts of a bicycle, or indeed on other equipment.

It should also be noted that the configuration of the arms 18 and their adjustability about the handlebars and with respect to the mounting member 36 is also considered to be inventive.

The invention claimed is:

1. A cargo pack carrier comprising:
an arm for attachment at one end to a component of a bicycle;
a mounting structure which is adjustably fitted to the other end of the arm; and
a carrier structure for attachment to the cargo pack,
the carrier structure comprising:
an attachment element in the form of a part-cylindrical recess, and
an anti-rotation abutment, and
the mounting structure comprising:
a mounting member provided with a cylindrical journal configured to be received in the recess of the attachment element of the carrier structure, and
an anti-rotation element which is spaced from the mounting member and is engageable with the anti-rotation abutment of the carrier structure to prevent rotation of the carrier structure about the mounting member.

2. A cargo pack carrier as claimed in claim 1, in which the attachment element is provided with a latch for retaining the mounting member within the recess.

3. A cargo pack carrier as claimed in claim 2, in which the latch is actuated manually for displacement between a release position in which the mounting member is movable into and out of the recess, and a latched position in which the latch prevents removal of the mounting member from the recess.

4. A cargo pack carrier as claimed in claim 2, in which the cylindrical journal is one of a pair of cylindrical journals provided on the mounting member, and the attachment element is one of two attachment elements with respective part-cylindrical recesses and latches.

5. A cargo pack carrier as claimed in claim 4, in which the latches are actuated by a common control element.

6. A cargo pack carrier as claimed in claim 5, in which the common control element comprises a handle operably connected to the latches through a cam mechanism which enables both latches to be actuated simultaneously in a single operation.

7. A cargo pack carrier as claimed in claim 1, in which the anti-rotation element on the mounting structure comprises a lever which is fixed with respect to the mounting member and projects outwardly of the axis of the er each journal.

8. A cargo pack carrier as claimed in claim 1, in which the anti-rotation abutment on the carrier structure comprises a bar secured to the carrier structure for engagement with the anti-rotation element.

9. A cargo pack carrier as claimed in claim 8, in which the anti-rotation element is provided with a recess for receiving the bar.

10. A cargo pack carrier as claimed in claim 2, in which operation of the latch displaces the bar into the recess of the anti-rotation element of the mounting structure.

11. A cargo pack carrier as claimed in claim 1, in which the anti-rotation element projects from the mounting structure in a direction generally away from the said one end of the arm.

12. A cargo pack carrier as claimed in claim 1, in which the anti-rotation element projects from the mounting structure in a direction obliquely towards the said one end of the arm.

13. A cargo pack carrier as claimed in claim 1, in which the carrier structure comprises a stiffening component to which the attachment element and the anti-rotation abutment are secured.

14. A cargo pack carrier as claimed in claim 13, in which the anti-rotation abutment is carried by the attachment element.

15. A cargo pack carrier as claimed in claim 13, in which the anti-rotation abutment and the attachment element are separately secured to the stiffening component.

16. A bicycle provided with a cargo pack carrier in accordance with claim 1.

17. A bicycle as claimed in claim 16, in which the arm is connected to a handlebar of the bicycle.

18. A cargo pack assembly comprising a cargo pack and a cargo pack carrier, the cargo pack carrier comprising:
an arm for attachment at one end to a component of a bicycle;
a mounting structure which is adjustably fitted to the other end of the arm; and
a carrier structure attached to the cargo pack,
the carrier structure comprising:
an attachment element in the form of a part-cylindrical recess, and an anti-rotation abutment, and the mounting structure comprising:

a mounting member provided with a cylindrical journal configured to be received in the recess of the attachment element of the carrier structure, and an anti-rotation element which is spaced from the mounting member and is engageable with the anti-rotation abutment of the carrier structure to prevent rotation of the carrier structure about the mounting member.

19. A cargo pack assembly as claimed in claim 18, in which a stiffening component is situated within the cargo pack and in which the carrier structure is situated on the exterior of the cargo pack, the attachment element and the anti-rotation abutment being secured to the stiffening component.

20. A cargo pack carrier comprising:

an arm for attachment at one end to a component of a bicycle;

a mounting structure which is adjustably fitted to the other end of the arm; and a carrier structure for attachment to the cargo pack, the carrier structure comprising:

an attachment element, and an anti-rotation abutment, and the mounting structure comprising:

a mounting member for receiving the attachment element of the carrier structure, and an anti-rotation element which is spaced from the mounting member and is engageable with the anti-rotation abutment of the carrier structure to prevent rotation of the carrier structure about the mounting member, the attachment element being provided with a latch for retaining the mounting member with respect to the attachment element.

21. A cargo pack carrier comprising:

an arm for attachment at one end to a component of a bicycle;

a mounting structure which is adjustably fitted to the other end of the arm; and a carrier structure for attachment to the cargo pack, the carrier structure comprising:

an attachment element, and an anti-rotation abutment, and the mounting structure comprising:

a mounting member for receiving the attachment element of the carrier structure, and an anti-rotation element which is spaced from the mounting member and is engageable with the anti-rotation abutment of the carrier structure to prevent rotation of the carrier structure about the mounting member, wherein the anti-rotation element projects from the mounting structure in a direction obliquely towards the said one end of the arm.

22. A cargo pack carrier comprising:

an arm for attachment at one end to a component of a bicycle;

a mounting structure which is adjustably fitted to the other end of the arm; and a carrier structure for attachment to the cargo pack, the carrier structure comprising:

an attachment element, an anti-rotation abutment, and a stiffening component, and the mounting structure comprising:

a mounting member for receiving the attachment element of the carrier structure, and an anti-rotation element which is spaced from the mounting member and is engageable with the anti-rotation abutment of the carrier structure to prevent rotation of the carrier structure about the mounting member, wherein the attachment element and the anti-rotation abutment are separately secured to the stiffening component.

\* \* \* \* \*